(12) United States Patent
Kong et al.

(10) Patent No.: US 9,990,639 B1
(45) Date of Patent: Jun. 5, 2018

(54) AUTOMATIC DETECTION OF FRAUDULENT REAL ESTATE LISTINGS

(71) Applicant: Trulia, Inc., San Francisco, CA (US)

(72) Inventors: Joseph Kong, Sunnyvale, CA (US); Abhinav Kulkarni, San Francisco, CA (US); Todd Holloway, San Francisco, CA (US)

(73) Assignee: Trulia, LLC, Seattle, WA (US)

( * ) Notice: Subject to any disclaimer, the term of this patent is extended or adjusted under 35 U.S.C. 154(b) by 381 days.

(21) Appl. No.: 14/558,390

(22) Filed: Dec. 2, 2014

(51) Int. Cl.
| | | |
|---|---|---|
| G06F 15/18 | (2006.01) | |
| G06Q 30/00 | (2012.01) | |
| G06N 99/00 | (2010.01) | |
| G06N 5/04 | (2006.01) | |
| G06N 7/00 | (2006.01) | |
| G06Q 50/16 | (2012.01) | |

(52) U.S. Cl.
CPC .......... *G06Q 30/0185* (2013.01); *G06N 5/04* (2013.01); *G06N 7/005* (2013.01); *G06N 99/005* (2013.01); *G06Q 50/16* (2013.01)

(58) Field of Classification Search
CPC combination set(s) only.
See application file for complete search history.

(56) References Cited

U.S. PATENT DOCUMENTS

| | | | |
|---|---|---|---|
| 5,361,201 A * | 11/1994 | Jost | ................. G06Q 40/02 705/35 |
| 8,108,271 B1 | 1/2012 | Duncan et al. | |
| 8,255,418 B2 | 8/2012 | Fuhry et al. | |
| 8,595,186 B1 | 11/2013 | Mandyam | |
| 9,361,583 B1 * | 6/2016 | Holloway | ................. G06N 5/02 |
| 2003/0187759 A1 * | 10/2003 | Arthus | .................. G06Q 20/04 705/30 |
| 2004/0138912 A1 | 7/2004 | Campbell et al. | |
| 2004/0193952 A1 | 9/2004 | Narayanan et al. | |
| 2005/0192930 A1 | 9/2005 | Hightower et al. | |
| 2005/0289196 A1 | 12/2005 | Starbuck et al. | |
| 2006/0212416 A1 | 9/2006 | Taylor et al. | |
| 2007/0133947 A1 | 6/2007 | Armitage et al. | |

(Continued)

OTHER PUBLICATIONS

Shin-Ying Huang, Rua-Huan Tsaih, Fang Yu, "Topological pattern discovery and feature extraction for fraudulent financial reporting", Expert Systems with Applications: An International Journal, vol. 41, Issue 9, Jul. 2014, pp. 4360-4372.*

(Continued)

*Primary Examiner* — Michael B Holmes
(74) *Attorney, Agent, or Firm* — Perkins Coie LLP

(57) ABSTRACT

A system for rental fraud detection comprises an input interface, a feature vector extractor, a model builder, and a predictor. The input interface is to receive a set of training data, wherein the set of training data comprises a set of rental fraud indications and to receive a set of prediction data. The feature vector extractor is to extract a first training set of feature vectors from the set of training data and to extract a first test feature vector from the set of prediction data. The model builder is to build a first model using the first training set of feature vectors and the rental fraud indications. The predictor is to predict whether the first test feature vector corresponds to fraudulent data using the first model.

20 Claims, 10 Drawing Sheets

(56) References Cited

U.S. PATENT DOCUMENTS

| | | | |
|---|---|---|---|
| 2007/0226129 A1* | 9/2007 | Liao | G06Q 20/10 |
| | | | 705/38 |
| 2008/0172393 A1 | 7/2008 | Baird et al. | |
| 2008/0244008 A1 | 10/2008 | Wilkinson et al. | |
| 2009/0006490 A1 | 1/2009 | Hunt et al. | |
| 2009/0187575 A1 | 7/2009 | DaCosta et al. | |
| 2009/0307050 A1 | 12/2009 | Fournier et al. | |
| 2011/0071924 A1 | 3/2011 | Desmond et al. | |
| 2011/0107301 A1 | 5/2011 | Chan et al. | |
| 2013/0041949 A1 | 2/2013 | Biesecker et al. | |
| 2013/0332374 A1* | 12/2013 | Hartnett | G06Q 50/16 |
| | | | 705/313 |
| 2016/0027051 A1 | 1/2016 | Gross | |
| 2016/0132946 A1* | 5/2016 | Bate | G06Q 30/0609 |
| | | | 705/26.35 |

OTHER PUBLICATIONS

Rongsheng Gong, Samuel H. Huang, "A Kolmogorov-Smirnov statistic based segmentation approach to learning from imbalanced datasets: With application in property refinance prediction", Expert Systems with Applications: An International Journal, vol. 39, Issue 6, May 2012, pp. 6192-6200.*

Joon Hur, Jong Woo Kim, "A hybrid classification method using error pattern modeling", Expert Systems with Applications, vol. 34, 2008, pp. 231-241.*

Noelia Garcia, Matias Gamez, Esteban Alfaro, "ANN+GIS: An automated system for property valuation", Neurocomputing, vol. 71, 2008, pp. 733-742.*

A multi-view multi-dimensional ensemble learning approach to mining business process deviances Alfredo Cuzzocrea; Francesco Folino; Massimo Guarascio; Luigi Pontieri 2016 International Joint Conference on Neural Networks (IJCNN) Year: 2016 pp. 3809-3816 IEEE Conference Publications.*

Detecting malicious URLs using machine learning techniques Frank Vanhoenshoven; Gonzalo Nápoles; Rafael Falcon; Koen Vanhoof; Mario Köppen 2016 IEEE Symposium Series on Computational Intelligence (SSCI) Year: 2016 pp. 1-8 IEEE Conference Publications.*

The prediction approach with Growing Hierarchical Self-Organizing Map Shin-Ying Huang; Rua-Huan Tsaih The 2012 International Joint Conference on Neural Networks (IJCNN) Year: 2012 pp. 1-7 IEEE Conference Publications.*

A multi-view multi-dimensional ensemble learning approach to mining business process deviances Alfredo Cuzzocrea; Francesco Folino; Massimo Guarascio; Luigi Pontieri 2016 International Joint Conference on Neural Networks (IJCNN) Year: 2016 pp. 3809-3816 IEEE Conferences.*

Prediction of authorship using various classification algorithms Chandrika Prasad; Jagadish S. Kallimani; Swapnil Jain 2017 International Conference on Advances in Computing, Communications and Informatics (ICACCI) Year: 2017 pp. 1671-1676 IEEE Conferences.*

Detecting malicious URLs using machine learning techniques Frank Vanhoenshoven; Gonzalo Nápoles; Rafael Falcon; Koen Vanhoof; Mario Köppen 2016 IEEE Symposium Series on Computational Intelligence (SSCI) Year: 2016 pp. 1-8 IEEE Conferences.*

The prediction approach with Growing Hierarchical Self-Organizing Map Shin-Ying Huang; Rua-Huan Tsaih The 2012 International Joint Conference on Neural Networks (IJCNN) Year: 2012 pp. 1-7 IEEE Conferences.*

U.S. Appl. No. 13/245,584, filed Sep. 26, 2011, Shefferman et al.

U.S. Appl. No. 14/325,078, filed Jul. 7, 2014, Rawat et al.

Akata, et al., "Good Practice in Large-Scale Learning for Image Classification." Retrieved from the internet on Jun. 3, 2015 <http://hal.inria.fr/docs/00/83/58/10/PDF/TPAMI_minor_revision.pdf> 15 pages.

Crammer et al., "Online Passive-Aggressive Algorithms." Retrieved from the internet on Jun. 3, 2015 <http://jmlr.org/papers/volume7/crammer06a/crammer06a.pdf> 35 pages.

Cuda-convnet. High-performance C++/CUDA implementation of convolutional neural networks. Retrieved from the internet on Jun. 3, 2015 <https://code.google.com/p/cuda-convnet/> 3 pages.

Final Office Action in U.S. Appl. No. 13/245,584, dated Feb. 6, 2015, 26 pages.

Final Office Action in U.S. Appl. No. 13/245,584, dated Jul. 9, 2013, 23 pages.

Flann-Fast Library for Approximate Nearest Neighbors. Retrieved from the internet on Jun. 3, 2015 <http://www.cs.ubc.ca/research/flann/> 2 pages.

Girshick, et al., "Rich feature hierarchies for accurate object detection and semantic segmentation." Retrieved from the internet on Jun. 3, 2015 <http://www.cs.berkeley.edu/~rbg/papers/r-cnn-cvpr.pdf> pp. 1-21.

GitHub, BVLC/Caffe. Retrieved from the internet on Jun. 3, 2015 <https://github.com/BVLC/caffe/blob/master/LICENSE> 1 page.

ImageNet. Retrieved from the internet on Jun. 3, 2015 <http://www.image-net.org/> 1 page.

Jia, Yangqing, et al. "Gaffe: Convolutional architecture for fast feature embedding." *Proceedings of the ACM International Conference on Multimedia*. ACM, 2014, 4 pages.

Lazebnik, et al., "Beyond Bags of Features: Spatial Pyramid Matching for Recognizing Natural Scene Categories ." Retrieved from the internet on Jun. 3, 2015 <http://www-cvr.ai.uiuc.edu/ponce_grp/publication/paper/cvpr06b.pdf> 8 pages.

Lowe, et al., "Distinctive Image Features from Scale-Invariant Keypoints," International Journal of Computer Vision, 60(2), 2004, pp. 91-110.

Non-Final Office Action in U.S. Appl. No. 13/245,584, dated Jul. 8, 2014, 20 pages.

Non-Final Office Action in U.S. Appl. No. 13/245,584, dated Nov. 27, 2012, 22 pages.

Non-Final Office Action in U.S. Appl. No. 13/245,584, dated Nov. 5, 2015, 26 pages.

Ojala, et al., "Multiresolution Gray-Scale and Rotation Invariant Texture Classification with Local Binary Patterns." Retrieved from the internet on Jun. 3, 2015 <http://www.outex.oulu.fi/publications/pami_02_opm.pdf>, pp. 1-35.

Opencv. Retrieved from the internet on Jun. 3, 2015 <http://opencv.org/> 3 pages.

Perronnin, et al., "Improving the Fisher Kernel for Large-Scale Classification." Retrieved from the internet on Jun. 3, 2015 <https://lear.inrialpes.fr/pubs/2010/PSM10/PSM10_0766.pdf> 14 pages.

Python. Pyleargist 1.0.1. Retrieved from the internet on Jun. 3, 2015 <https://pypi.python.org/pypi/pyleargist/1.0.1> 2 pages.

Scikit-image. Image processing in python. Retrieved from the internet on Jun. 3, 2015 <http://scikit-image.org> 2 pages.

Scikit-learn. Machine Learning in Python. Retrieved from the internet on Jun. 3, 2015 <http://scikit-learn.org/stable/> 3 pages.

Siagian, et al., "Rapid Biologically-Inspired Scene Classification Using Features Shared with Visual Attention." IEEE Transactions on Pattern Analysis and Machine Intelligence, Feb. 2007, pp. 1-19.

Theano. Retrieved from the internet on Jun. 3, 2015 <http://deeplearning.net/software/theano/> 3 pages.

Tola, et al., "Daisy: An Efficient Dense Descriptor Applied to Wide Baseline Stereo," Ecole Polytechnique Federale de Lausanne, Jun. 14, 2009, pp. 1-31.

Van de Sande et al., "Evaluation of Color Descriptors for Object and Scene Recognition." Retrieved from the internet on Jun. 3, 2015 <https://staff.fnwi.uva.nl/k.e.a.vandesande/pub/vandesande-cvpr2008.pdf> 8 pages.

Zhou, et al., "Image Classification using Super-Vector Coding of Local Image Descriptors." Retrieved from the internet on Jun. 3, 2015 <http://stat.rutgers.edu/home/tzhang/papers/eccv10_supervect.pdf>, pp. 1-14.

Non-Final Office Action in U.S. Appl. No. 13/245,584, dated Jul. 18, 2016, 26 pages.

Non-Final Office Action in U.S. Appl. No. 14/325,078, dated Mar. 6, 2017, 14 pages.

(56) References Cited

OTHER PUBLICATIONS

Final Office Action in U.S. Appl. No. 13/245,584, dated Apr. 10, 2017, 27 pages.
Non-Final Office Action in U.S. Appl. No. 13/245,584, dated Oct. 5, 2017, 27 pages.

* cited by examiner

AUTOMATIC DETECTION OF FRAUDULENT REAL ESTATE LISTINGS

BACKGROUND OF THE INVENTION

A real estate website comprises a set of real estate listings, including properties for sale and/or properties for rent. Rental property listings include property details, property images, property location, property price, landlord information, renter qualifications information, or any other appropriate information. It is possible for a criminal to place a fraudulent real estate listing into a real estate website—for instance, in an attempt to receive money for a property deposit without actually providing a property rental. The presence of fraudulent real estate listings is detrimental to the value of the real estate website, as potential customers will not trust the displayed real estate listings.

BRIEF DESCRIPTION OF THE DRAWINGS

Various embodiments of the invention are disclosed in the following detailed description and the accompanying drawings.

DETAILED DESCRIPTION

Figure 1:
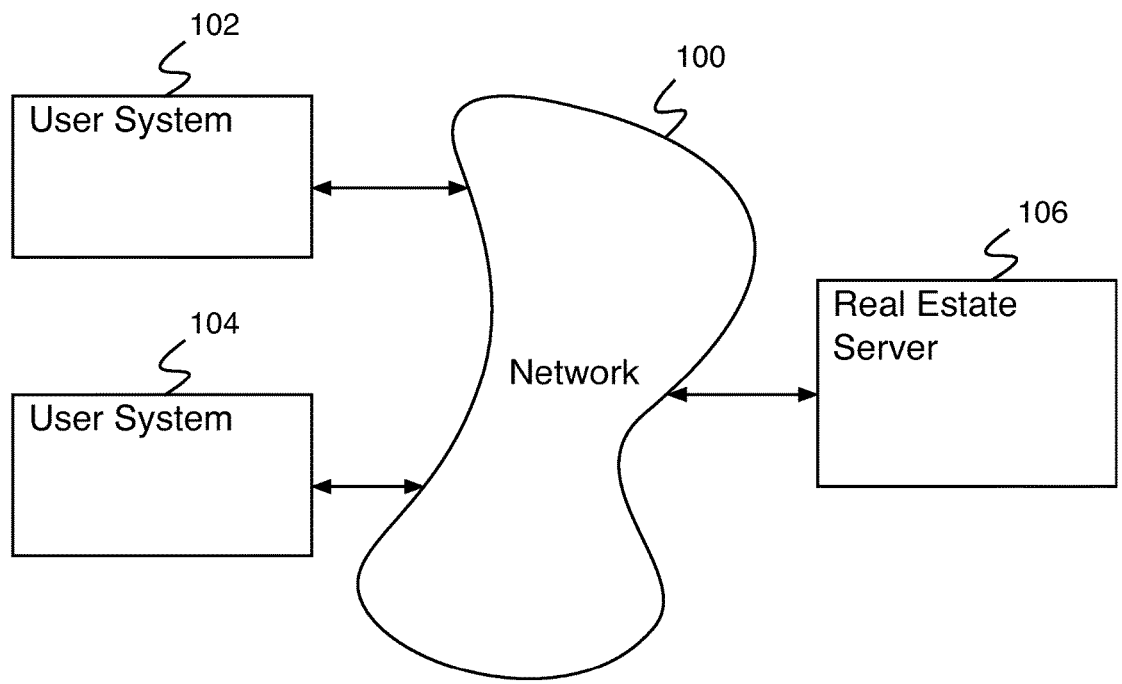
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for rental fraud detection comprises an input interface to receive a set of training data, wherein the set of training data comprises a set of rental fraud indications, and receive a set of prediction data; a feature vector extractor to extract a first training set of feature vectors from the set of training data, and extract a first test feature vector from the set of prediction data; a model builder to build a first model using the first training set of feature vectors and the rental fraud indications; and a predictor to predict whether the first test feature vector corresponds to fraudulent data using the first model.

In some embodiments, a system for rental fraud detection analyzes a large set of real estate rental listings (e.g., on a real estate rental website) and makes a determination of the subset of rental listings that are fraudulent. In some embodiments, a fraudulent real estate rental listing comprises a rental listing intended to defraud potential renters of money rather than to provide them with a rental. Some real estate rental websites receive a large number of fraudulent listings, necessitating an automatic system to detect and remove them. Without an automated system, the performance suffers (e.g., fraudulent listings are presented or valid listings are not presented). In some embodiments, the system detects fraudulent listings in real-time—for example, avoiding posting delays of submissions for rental listings by checking submissions using one or more models. The system for rental fraud detection uses machine learning techniques to create a model to estimate the probability a rental listing is fraudulent. The system makes the decision that the rental listing is fraudulent in the event that the estimated probability is above a threshold. In some embodiments, multiple models are created and the results combined (e.g., by checking each probability against a threshold, by averaging the probabilities and comparing to a threshold, by weighing and averaging the probabilities and comparing to a threshold, etc.). The system for rental fraud detection creates a model by analyzing a set of real estate rental listings for which the fraudulence is initially known. A feature vector is created by a feature vector extractor for each real estate listing. Each feature of the feature vector extractor comprises an attribute determinable from the real estate listing, for example a property attribute (e.g., property type, square footage, number of bedrooms, number of bathrooms, number of rooms, etc.), a property location attribute (e.g., city, county, state, zip code, three digit zip code prefix, etc.), number of photos, price, a price percentile (e.g., the percentile of the price within the range of prices seen for similar real estate listings), a listing agent identifier, a listing feed identifier, attributes extracted from a text description, an attribute describing the geographical spread of listings posted by the associated agent, a fraud rate attribute (e.g., fraud rate for the associated location, fraud rate for the associated property attributes, fraud rate for the associated property type, fraud rate associated with the listing agent, fraud rate associated with the listing feed, etc.). In some embodiments, a feature vector is designed to comprise information most likely to distinguish a fraudulent listing from a non-fraudulent listing (e.g., a feature vector associated with a fraudulent listing is mathematically distinguishable from a feature vector associated with a non-fraudulent listing). A mathematical model is trained by analyzing the set of feature vectors associated with the real estate rental listings for which the fraudulence is initially known, and then applies the model to feature vectors associated with real estate listings for which fraudulence is to be determined. In some embodiments, the mathematical model comprises a machine learning classifier (e.g., a linear classifier, a non-linear classifier, a support vector machine, a gradient boosted machine, etc.). In some embodiments, the feature vector extractor extracts a first feature vector associated with a first model and a second feature vector associated with a second model. In some embodiments, a first feature vector and a second feature vector comprise different feature categories (e.g., the first feature vector comprises features associated with the location and the second feature vector comprises features associated with the listing agent).

FIG. 1 is a block diagram illustrating an embodiment of a network system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, user system 102 and user system 104 comprise user systems (e.g., computing systems for operation by users, e.g., desktop computers, laptop computers, tablet computers, smartphones, wearable computers, etc.). In some embodiments, one or more of user system 102 and user system 104 comprises a system accessed by a user directly (e.g., the user is in proximity with the user system). In some embodiments, one or more of user system 102 and user system 104 comprises a system accessed by a user remotely (e.g., the user is not in proximity with the user system, and accesses the user system via network 100 and a separate user system). In some embodiments, one or more of user system 102 and user system 104 comprise customer systems (e.g., customer systems used by real estate customers). In some embodiments, one or more of user system 102 and user system 104 comprise agent systems (e.g., agent systems used by real estate agents). User system 102 and user system 104 comprise systems accessing real estate server 106 (e.g., accessing real estate server 106 via network 100). In various embodiments, there are 2, 5, 22, 122, 4320, 26100, 136500, or any other appropriate number of user systems accessing real estate server 106. In various embodiments, a customer or a real estate agent utilizes a user system (e.g., user system 102 or user system 104) to upload real estate information to real estate server 106, to upload images to real estate server 106, to perform searches on real estate server 106, to view property listings on real estate server 106, or for any other appropriate purpose. In various embodiments, real estate server 106 comprises a server for providing real estate listings, a server for providing a real estate listings website, a server for providing real estate listing recommendations, a server for assisting a real estate agent rent real estate, a server for connecting a real estate customer and a real estate agent, or a server for any other appropriate purpose. In various embodiments, real estate server 106 comprises a computer, a computer with multiple processors, multiple computers connected via a local network, multiple computers connected via a wide area network, multiple computers connected via the Internet, multiple computers connected via network 100, or any other appropriate computing system or systems. In various embodiments, the processors comprising user system 102, user system 104, and real estate listings system 106 comprise any one of a variety of proprietary or commercially available single or multi-processor systems (e.g., an Intel™-based processor) or other type of commercially available processor able to support communications in accordance with each particular embodiment and application. In some embodiments, real estate server 106 comprises a fraudulent real estate listing detector for detecting fraudulent real estate listings. In some embodiments, a real estate agent accessing a user system (e.g., user system 102 or user system 104) can upload a real estate rental listing to real estate server 106. In some embodiments, a real estate agent adds a real estate rental listing to an external feed (e.g., an external website for distributing real estate rental listings). In some embodiments, real estate listings from one or more external feeds are imported to real estate server 106.

Figure 2:
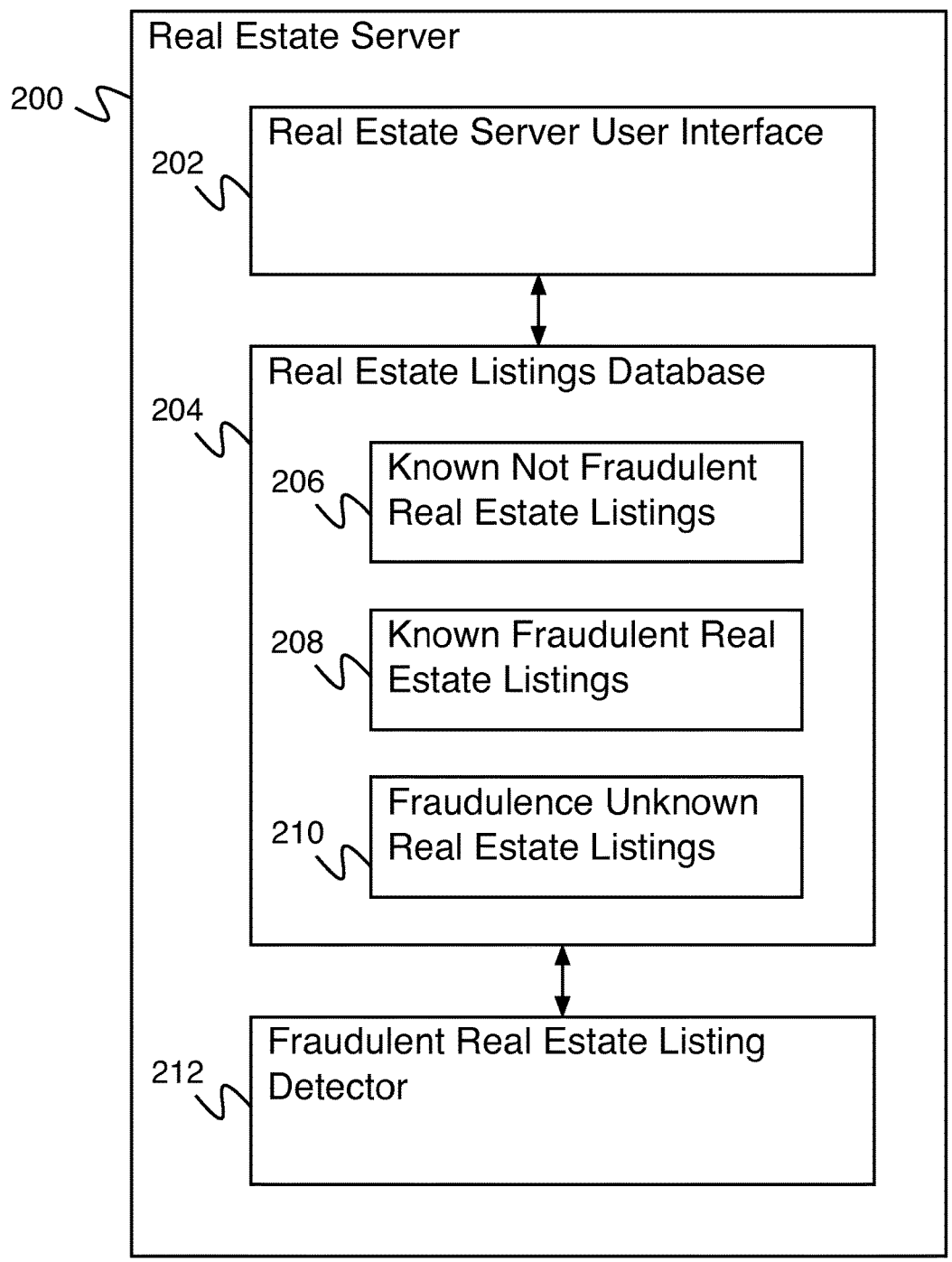
FIG. 2 is a block diagram illustrating an embodiment of a real estate server.

FIG. 2 is a block diagram illustrating an embodiment of a real estate server. In some embodiments, real estate server 200 of FIG. 2 comprises real estate server 106 of FIG. 1. In the example shown, real estate server 200 comprises real estate server user interface 202. In various embodiments, real estate server user interface 202 provides an interface for accessing real estate listings, for uploading real estate listings, for indicating to import real estate listings (e.g., from an external feed), or any other appropriate purpose. Real estate server 200 additionally comprises real estate listings database 204. Real estate listings database 204 comprises real estate listings information (e.g., property attributes, property location, price, images, real estate agent, supplying feed, etc.). Real estate listings database comprises known not fraudulent real estate listings 206, known fraudulent real estate listings 208, and fraudulence unknown real estate listings 210. In some embodiments, known not fraudulent real estate listings 206, and known fraudulent real estate listings 208 are used to train a model for detecting fraudulent real estate listings. In some embodiments, known fraudulent real estate listings are not displayed to a user (e.g., via real estate server user interface 202). Fraudulent real estate listing detector 212 comprises a detector for detecting fraudulent real estate listings. In some embodiments, fraudulent real estate listing detector 212 comprises a model for detecting fraudulent real estate listings (e.g., trained using known not fraudulent real estate listings 206, and known fraudulent real estate listings 208). In some embodiments, the model is used to make a determination of whether real estate listings comprising fraudulence unknown real estate listings 210 are fraudulent.

Figure 3:
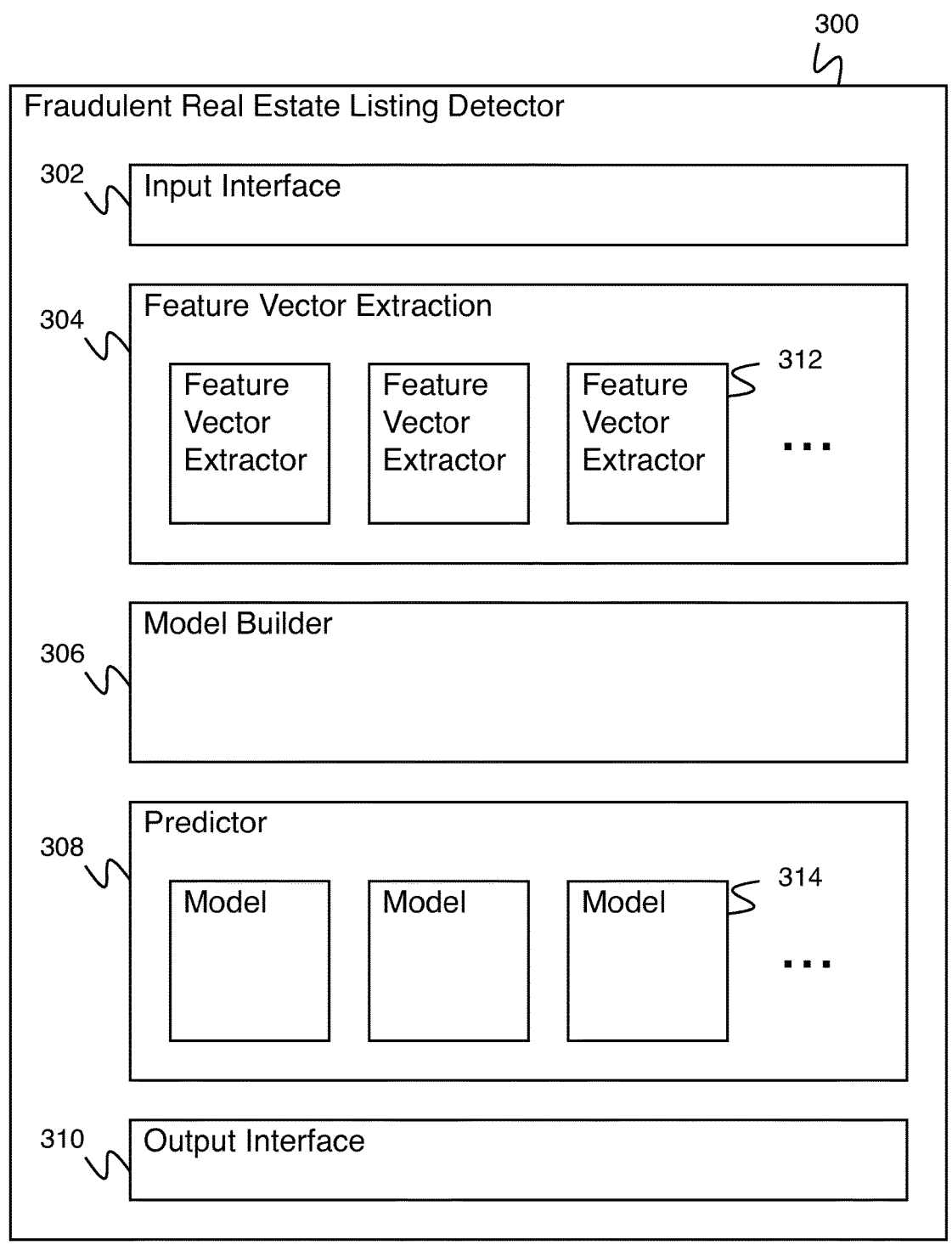
FIG. 3 is a block diagram illustrating an embodiment of a fraudulent real estate listing detector.

FIG. 3 is a block diagram illustrating an embodiment of a fraudulent real estate listing detector. In some embodiments, fraudulent real estate listing detector 300 comprises fraudulent real estate listing detector 212 of FIG. 2. In the example shown, fraudulent real estate listing detector 300 comprises input interface 302. In some embodiments, input interface 302 receives a set of training data, wherein the set of training data comprises a set of rental fraud indications (e.g., known not fraudulent real estate listings 206 of FIG. 2, known fraudulent real estate listings 208 of FIG. 2, etc.). In some embodiments, input interface 302 receives a set of prediction data (e.g., fraudulence unknown real estate listings 210 of FIG. 2). In some embodiments, input interface 302 is implemented using a processor. Fraudulent real estate listing detector 300 additionally comprises feature vector extraction 304. In some embodiments, feature vector extraction 304 comprises one or more feature vector extractors (e.g., feature vector extractor 312) for processing a real estate listing and determining a feature vector. In some embodiments, each feature vector of feature vector extraction 304 determines a different feature vector for a given real estate listing (e.g., including a different set of features). In some embodiments, feature vector extraction 304 is implemented using a processor. Model builder 306 comprises a model builder for receiving feature vectors (e.g., from feature vector extraction 304) and associated rental fraud indications and building one or more models. In some embodiments, the model distinguishes feature vectors associated with real estate listings known to be fraudulent from real estate listings known to be not fraudulent. In some embodiments, model builder builds one model associated with each feature vector extractor of feature vector extraction 304. In some embodiments, the one or more models produced by model builder 306 are stored by predictor 308. In some embodiments, model builder 306 is implemented using a processor. Predictor 308 comprises a predictor for receiving one or more models (e.g., from model builder 306) and one or more feature vectors (e.g., from feature vector extraction 304) and making a determination of whether the real estate listing associated with the feature vector or vectors is fraudulent. In some embodiments, predictor 308 is implemented using a processor. Output interface 310 comprises an output interface for receiving a fraudulence determination (e.g., from predictor 308) and providing the determination (e.g., to real estate listings database 204 of FIG. 2). In various embodiments, in the event the determination comprises a determination that the real estate listing is fraudulent, providing the determination comprises providing an indication to hide the real estate listing, to delete the real estate listing, to mark the real estate listing as fraudulent, or to process the real estate listing in any other appropriate way. In some embodiments, output interface 310 is implemented using a processor. In various embodiments, modules of fraudulent real estate listing detector 300 are all implemented on a single processor, are each implemented on separate processors, are implemented combined onto multiple processors in any appropriate way, or are implemented in any other appropriate way.

Figure 4:
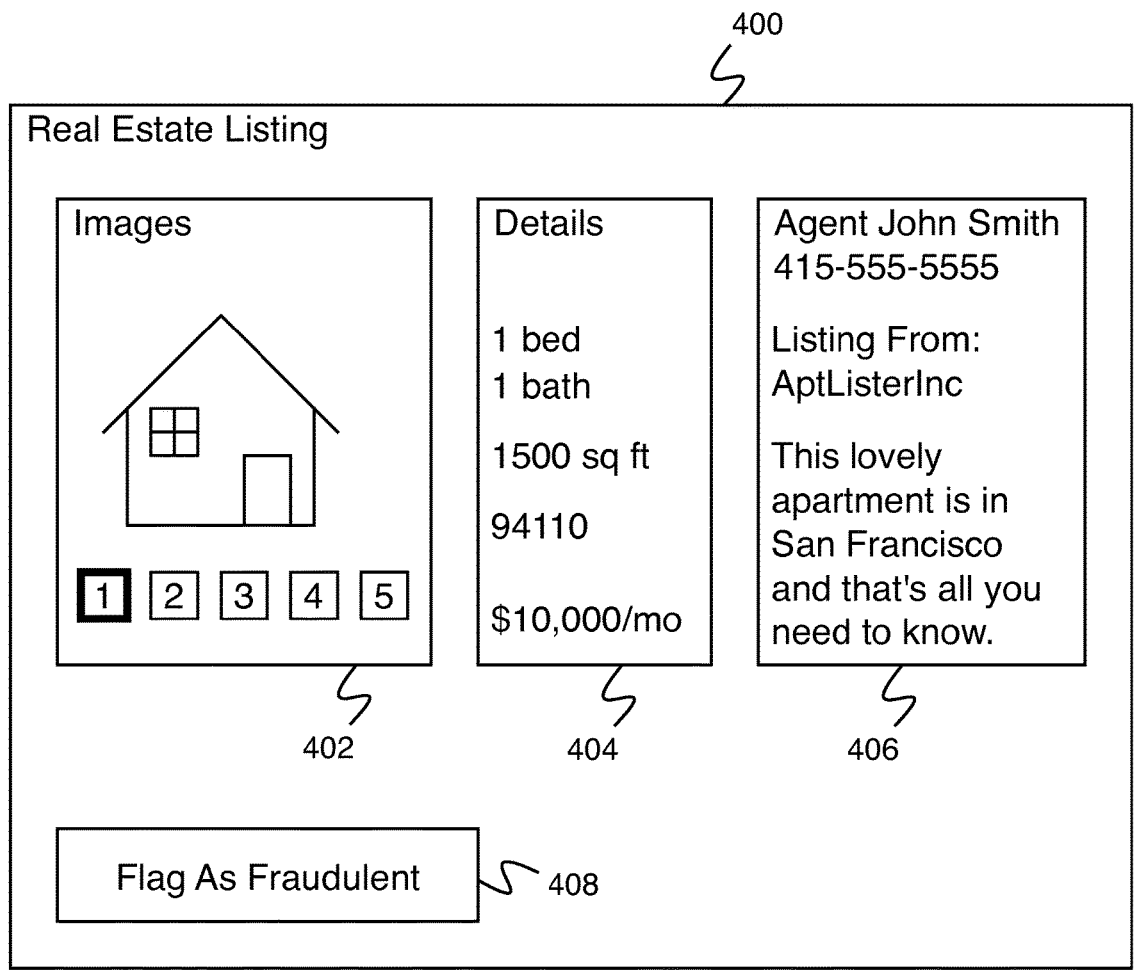
FIG. 4 is a diagram illustrating an embodiment of a real estate listing.

FIG. 4 is a diagram illustrating an embodiment of a real estate listing. In some embodiments, real estate listing 400 is stored by real estate server 200 (e.g., as part of real estate listings database 204). In some embodiments, real estate listing 400 is provided to a real estate customer looking for an apartment rental (e.g., as part of a real estate website user interface). In the example shown, real estate listing 400 comprises a real estate rental listing. Images panel 402 comprises a display for showing a set of real estate images. Property details panel 404 comprises a display for showing a set of property details (e.g., number of bedrooms, number of bathrooms, square footage, location, price, etc.). Other property information panel 406 comprises any other appropriate property information (e.g., agent name and phone number, real estate listing source, text description, etc.). In some embodiments, a real estate listing source comprises an external real estate listing aggregator providing listings to the real estate website. Real estate listing 400 additionally comprises flag as fraudulent button 408. In some embodiments, a user makes an indication using flag as fraudulent button 408 in the event the user determines (e.g., from the information shown in images 402, property details 404, other property information 406, or any other real estate listing information) that real estate listing 400 comprises a fraudulent real estate listing. In some embodiments, in the event a user makes an indication to flag as fraudulent button 408, real estate listing 400 is provided to a real estate website for further review. In some embodiments, all information of real estate listing 400 is available for use as a feature of a feature vector in a fraudulent real estate listing detector. In some embodiments, other information is additionally available for use as a feature of a feature vector in a fraudulent real estate listing detector.

Figure 5:
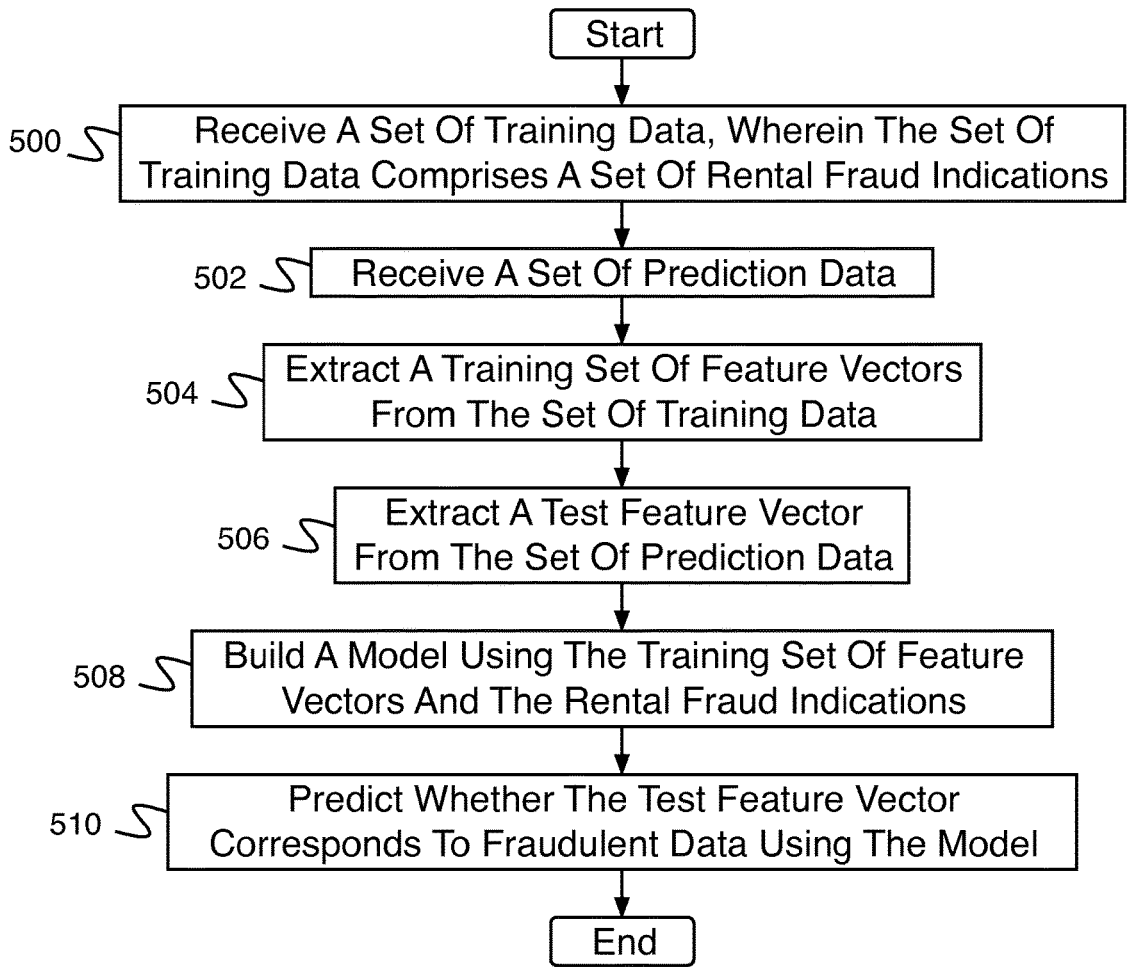
FIG. 5 is a flow diagram illustrating an embodiment of a process for detecting fraudulent real estate listings.

FIG. 5 is a flow diagram illustrating an embodiment of a process for detecting fraudulent real estate listings. In some embodiments, the process of FIG. 5 is performed by fraudulent real estate listing detector 212 of FIG. 2. In the example shown, in 500, a set of training data is received, wherein the set of training data comprises a set of rental fraud indications. In some embodiments, the set of training data comprises real estate listings known to be not fraudulent (e.g., known not fraudulent real estate listings 206 of FIG. 2) and real estate listings known to be fraudulent (e.g., known fraudulent real estate listings 208 of FIG. 2). In 502, a set of prediction data is received. In some embodiments, the set of prediction data comprises one or more real estate listings of unknown fraudulence (e.g., one or more real estate listings of fraudulence unknown real estate listings 210 of FIG. 2). In 504, a training set of feature vectors is extracted from the set of training data. In some embodiments, a feature vector is extracted for each real estate listing of the set of training data. In various embodiments, two feature vectors are extracted for each real estate listing of the set of training data, three feature vectors are extracted for each real estate listing of the set of training data, five feature vectors are extracted for each real estate listing of the set of training data, or any other appropriate number of feature vectors are extracted for each real estate listing of the set of training data. In 506, a test feature vector is extracted from the set of prediction data. In some embodiments, a feature vector is extracted from one real estate listing of the set of prediction data. In some embodiments, more than one test feature vector is extracted. In various embodiments, two feature vectors are extracted from one real estate listing of the set of prediction data, four feature vectors are extracted from one real estate listing of the set of prediction data, seven feature vectors are extracted from one real estate listing of the set of prediction data, or any other appropriate number of feature vectors are extracted from one real estate listing of the set of prediction data.

In 508, a model is built using the training set of feature vectors and the rental fraud indications. In some embodiments, a machine learning algorithm is trained using the training set of feature vectors. In some embodiments, each feature vector of the training set of feature vectors is associated with a rental fraud indication (e.g., a feature vector extracted from a real estate listing of the set of real estate listings known to not be fraudulent is associated with a not fraudulent rental fraud indication). In some embodiments, more than one model is built (e.g., two models, three models, eight models, etc.). In some embodiments, the multiple models comprise the same model type (e.g., a gradient boosted machine), e.g., with different feature vectors created using different feature vector extractors. In some embodiments, the multiple models comprise different model types (e.g., a gradient boosted machine, a linear classifier, a support vector machine, etc.). In 510, the model is used to predict whether the test feature vector corresponds to fraudulent data (e.g., to a fraudulent real estate listing). In some embodiments, when the model is built in 508, a subset (e.g., 50%, 75%, 80%, 90%, etc.) of the training set of feature vectors is used. Feature vectors of the training set of feature vectors that are not used for building the model are used for testing the model. For instance, the model is used to predict fraudulence of the feature vectors of the training set of feature vectors that are not used for building the model. The model predictions can then be compared with the associated rental fraud indications to determine a model precision (e.g., fraction of real estate listings flagged as fraudulent that are actually fraudulent) and a model recall (e.g., the fraction of fraudulent listings that are flagged as fraudulent).

In some embodiments, a set of prediction models are combined as follows and include the feature vectors:
Prediction_probability=0.25*Prediction_model1+ 0.75*Prediction_model2
relative influence on output for Model 1 (rel. influence scores add up to 100):
fraudrate_feedid 67.32293111
fraudrate_zip3bed_feedid 16.36138039
numFraudsInFeedId 6.84098439
relrankPriceZip5Bed 2.11408650
fraudrate_zip3 1.76346977
fraudrate_zip5 1.37443170
relative influence on output for Model 2:
FRAUDRATE_EMAILHOST 50.90654
FRAUD_RATE_TOTAL 11.39362
MILE_SPREAD_SD_EMAIL 7.124268
NUM_PROPERTIES_EMAIL 5.137989
NUM_FRAUD_PROPERTIES_PHONE 4.246781
FRAUD_RATE_PHONE 3.865415
PRECISION/RECALL: 92.9%/93.6%. Proposed operating point: cutoff_prob=0.77

In some embodiments, precision=(#true positives/#positives). In some embodiments, recall=(#true positives/#true frauds)

In some embodiments, a set of prediction models are combined as follows and include the feature vectors:
Prediction_probability=0.5*Prediction_model1+0.5*Prediction_model2
relative influence on output for Model 1 (rel. influence scores add up to 100):
fraudrate_feedid 59.62129008
fraudrate_zip3bed_feedid 16.51968842
numFraudsInFeedId 16.40254243
relrankPriceZip5Bed 1.64460890
fraudrate_zip5bed_feedid 1.46281789
fraudrate_zip3 1.29102950
relrankPriceZip3Bed 0.87750035
fraudrate_zip5 0.78626547
relative influence on output for Model 2:
FRAUD_RATE_TOTAL 79.36928
FRAUD_RATE_PHONE 11.35541
FRAUD_RATE_EMAIL 7.711617
NUM_FRAUD_PROPERTIES_PHONE 0.3952701
NUM_FRAUD_PROPERTIES_EMAIL 0.3272442
MILE_SPREAD_SD_EMAIL 0.2696568
MILE_SPREAD_SD_PHONE 0.1138384
PRECISION/RECALL: 84.1%/84.1%.

In some embodiments, a set of prediction models are combined as follows and include the feature vectors:
Prediction_probability=0.5*Prediction_model1+0.5*Prediction_model2
relative influence on output for Model 1 (rel. influence scores add up to 100):
fraudrate_feedid 64.15032575
fraudrate_zip3bed_feedid 15.54898979
numFraudsInFeedId 11.66877114
fraudrate_zip5bed_feedid 2.24138801
fraudrate_zip5 1.68186591
fraudrate_zip3bed 1.34330556
fraudrate_zip3 1.31911808
relrankPriceZip5Bed 0.99240156
relrankPriceZip3Bed 0.54119526
price 0.24980831
fraudrate_zip5bed 0.17940895
relative influence on output for Model 2:
SOURCE_TYPE 59.39680920
FRAUD_RATE_PHONE 13.66722062
NUM_FRAUD_PROPERTIES_EMAIL 5.85313987
RENTAL_TYPE 4.46392663
FRAUD_RATE_EMAIL 3.81053460
NUM_PROPERTIES_EMAIL 3.60590651
MILE_SPREAD_MAX_EMAIL 2.53951055
NUM_PROPERTIES_PHONE 2.44554312
AREA_CODE_STATE_MATCH 1.60521791
AREA_CODE_ZIP_CODE_DISTANCE 1.06911790
DISTINCT_CITIES_PHONE 0.57606245

In some embodiments, a prediction model includes the feature vectors:
fraudrate_feedid 62.813812594
fraudrate_zip3bed_feedid 14.267585853
numFraudsInFeedId 10.711803493
FRAUD_RATE_PHONE 3.711830107
fraudrate_zip3bed 1.277583601
FRAUD_RATE_EMAIL 1.156720788
fraudrate_zip5bed_feedid 1.074536714
relrankPriceZip5Bed 0.790355203
fraudrate_zip3 0.787715940
MILE_SPREAD_MAX_EMAIL 0.646638615
DISTINCT_ZIP_CODES_EMAIL 0.597997296
fraudrate_zip5 0.497200997
NUM_PROPERTIES_EMAIL 0.387145361
relrankPriceZip3Bed 0.334815214
SOURCE_TYPE 0.201909303

In some embodiments, a definition for the feature vectors is as follows:
fraudrate_feedid—fraud rate among listings that come from the same feed identifier as the listing being considered;
fraudrate_zip3bed_feedid—fraud rate among listings that are in the same zip prefix 3, have the same number of bedrooms and come from the same feed identifier as the listing being considered;
fraudrate_zip5bed_feedid—fraud rate among listings that are in the same zip code, have the same number of bedrooms and come from the same feed identifier as the listing being considered;
numFraudsInFeedId—logarithm of the number of frauds from the same feed identifier;
relrankPriceZip3Bed—price percentile among listings from the same zip prefix 3 and with the same number of bedrooms;
relrankPriceZip5Bed—price percentile among listings from the same zip code and with the same number of bedrooms;
fraudrate_zip3—fraud rate among listings that come from the same zip prefix 3;
fraudrate_zip5—fraud rate among listings that come from the same zip code;
FRAUDRATE_EMAILHOST—fraud rate among listings that come from the same email host (i.e., the part of the email address that comes after '@');
FRAUD_RATE_PHONE—fraud rate among listings that come from the same phone number;

FRAUD_RATE_EMAIL—fraud rate among listings that come from the same email address;

FRAUD_RATE_TOTAL—maximum of FRAUDRATE_EMAIL and FRAUD_RATE_PHONE;

MILE_SPREAD_SD_PHONE—first, for all listings submitted by the same number as the listing being considered, calculate the latitude/longitude of the centroid; second, calculate distances in miles for each of the listing to the centroid; third return the standard deviation of the distances to the centroid;

MILE_SPREAD_SD_EMAIL—first, for all listings submitted by the same email address as the listing being considered, calculate the latitude/longitude of the centroid; second, calculate distances in miles for each of the listing to the centroid; third return the standard deviation of the distances to the centroid;

NUM_PROPERTIES_EMAIL—total number of listings submitted by the same email address as the listing being considered;

NUM_PROPERTIES_PHONE—total number of listings submitted by the same phone number as the listing being considered;

NUM_FRAUD_PROPERTIES_EMAIL—total number of fraud listings submitted by the same email address as the listing being considered;

NUM_FRAUD_PROPERTIES_PHONE—total number of fraud listings submitted by the same phone number as the listing being considered;

SOURCE_TYPE—type of rental source;

RENTAL_TYPE—type of rental listing;

AREA_CODE_STATE_MATCH—whether the area code of the phone number from the listing is in the state where the listing is located;

AREA_CODE_ZIP_CODE_DISTANCE—distance in miles between the zip where the listing is located and the geographic areas served by the area code of the phone that is on the listing;

DISTINCT_CITIES_PHONE—of all the listings submitted by the same phone number, find the number of distinct cities in these listings;

MILE_SPREAD_MAX_PHONE—first, for all listings submitted by the same phone number as the listing being considered, calculate the latitude/longitude of the centroid; second, calculate distances in miles for each of the listing to the centroid; third return the maximum of the distances to the centroid;

MILE_SPREAD_MAX_EMAIL—first, for all listings submitted by the same email address as the listing being considered, calculate the latitude/longitude of the centroid; second, calculate distances in miles for each of the listing to the centroid; third return the maximum of the distances to the centroid;

In various embodiments, feature vectors comprise email related feature vectors, phone related feature vectors, listing related feature vectors, or any other appropriate feature vector category.

In various embodiments, models are combined using ensemble techniques, using boosting, using a machine learning algorithm (e.g., linear regression, logistic regression, gradient boosting machines, etc.) to train a machine learned model to combine model outputs, or any other appropriate manner of combining models.

Figure 6:
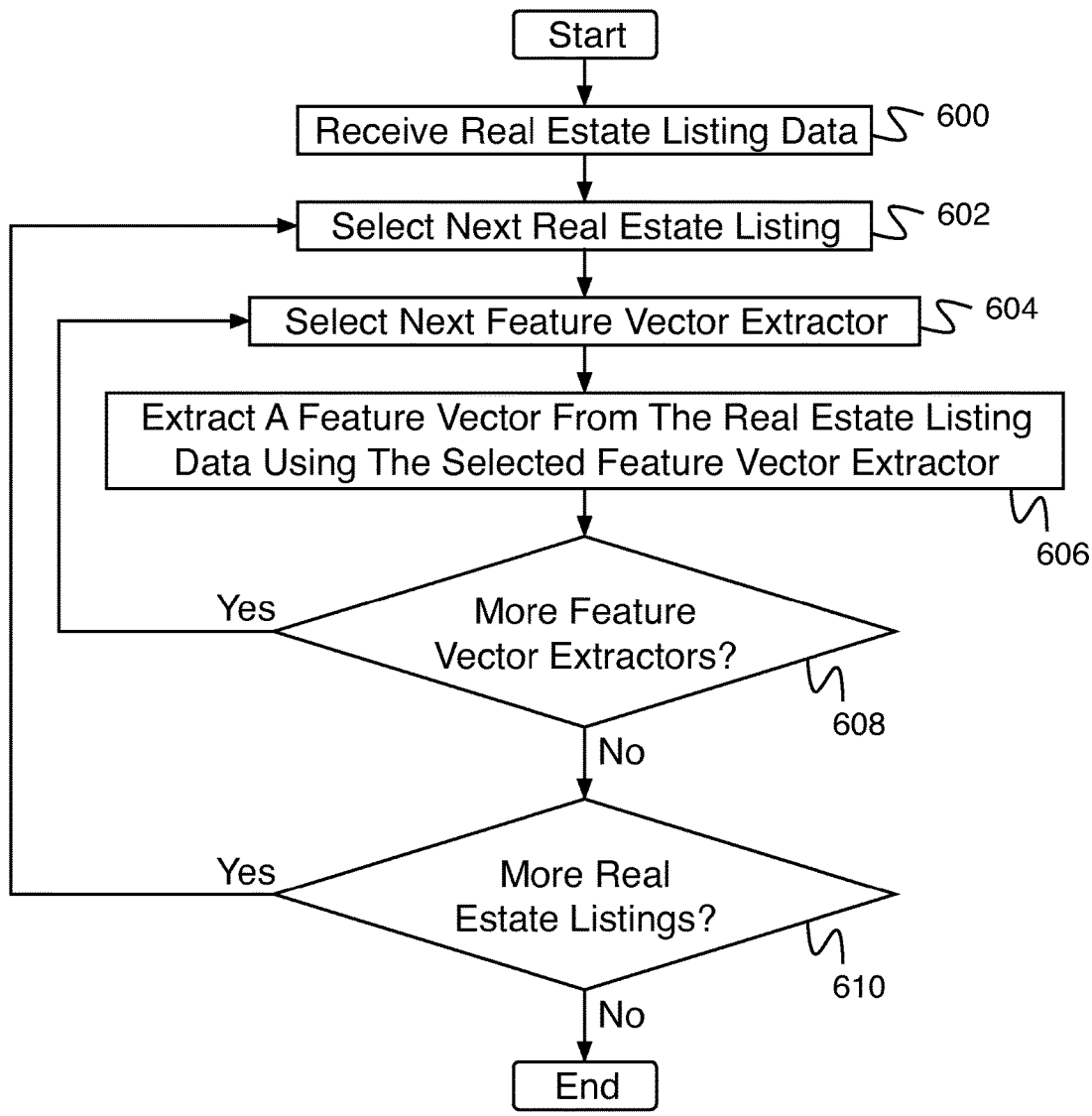
FIG. 6 is a flow diagram illustrating an embodiment of a process for extracting feature vectors from a set of real estate listing data.

FIG. 6 is a flow diagram illustrating an embodiment of a process for extracting feature vectors from a set of real estate listing data. In some embodiments, the process of FIG. 6 implements 504 of FIG. 5. In some embodiments, the process of FIG. 6 implements 506 of FIG. 5. In the example shown, in 600, real estate listing data is received. In 602, the next real estate listing is selected. In some embodiments, the next real estate listing comprises the first real estate listing. In 604, the next feature vector extractor (e.g., the next feature vector of feature vector extraction 304 of FIG. 3) is selected. In some embodiments, the next feature vector comprises the first feature vector. In 606, a feature vector is extracted from the real estate listing data using the selected feature vector extractor. In some embodiments, extracting a feature vector comprises determining a set of feature values (e.g., price percentage, fraud rate, number of bedrooms, etc.) from the real estate data. In 608, it is determined whether there are more feature vector extractors. In the event that there are more feature vector extractors, control passes to 604. In the event that there are not more feature vector extractors, control passes to 610. In 610, it is determined whether there are more real estate listings. In the event there are more real estate listings, control passes to 602. In the event there are not more real estate listings, the process ends.

Figure 7:
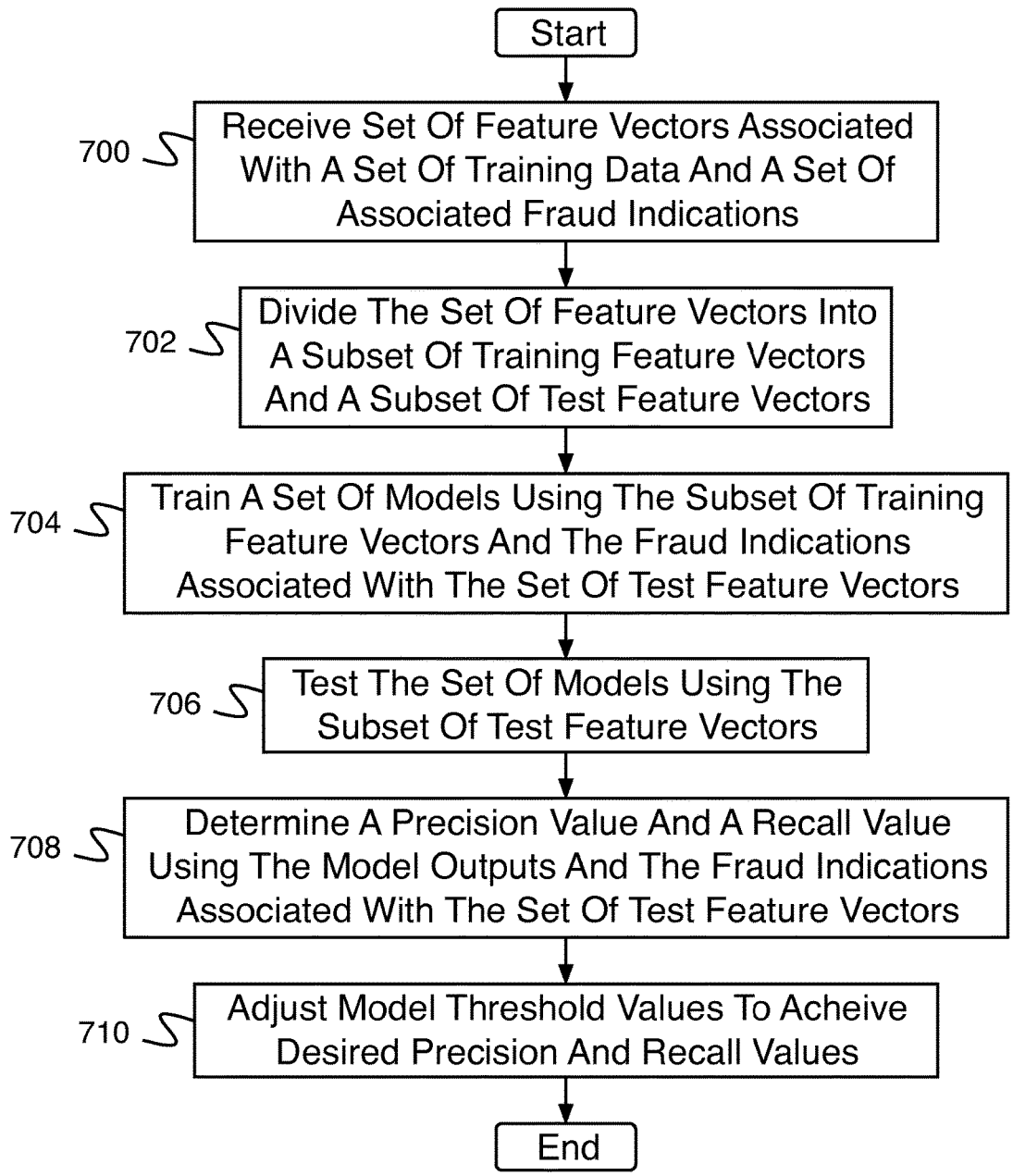
FIG. 7 is a flow diagram illustrating an embodiment of a process for building one or more models.

FIG. 7 is a flow diagram illustrating an embodiment of a process for building one or more models. In some embodiments, the process of FIG. 7 implements 508 of FIG. 5. In the example shown, in 700, a set of feature vectors associated with a set of training data and a set of associated rental fraud indications is received. In 702, the set of feature vectors is divided into a subset of training feature vectors and a subset of test feature vectors. In 704, a set of models is trained using the subset of training feature vectors and the rental fraud indications associated with the set of test feature vectors. In 706, the set of models is tested using the subset of test feature vectors. In 708, a precision value and a recall value are determined using the model outputs and the rental fraud indications associated with the set of test feature vectors. In 710, the model threshold values are adjusted to achieve desired precision and recall values.

Figure 8:
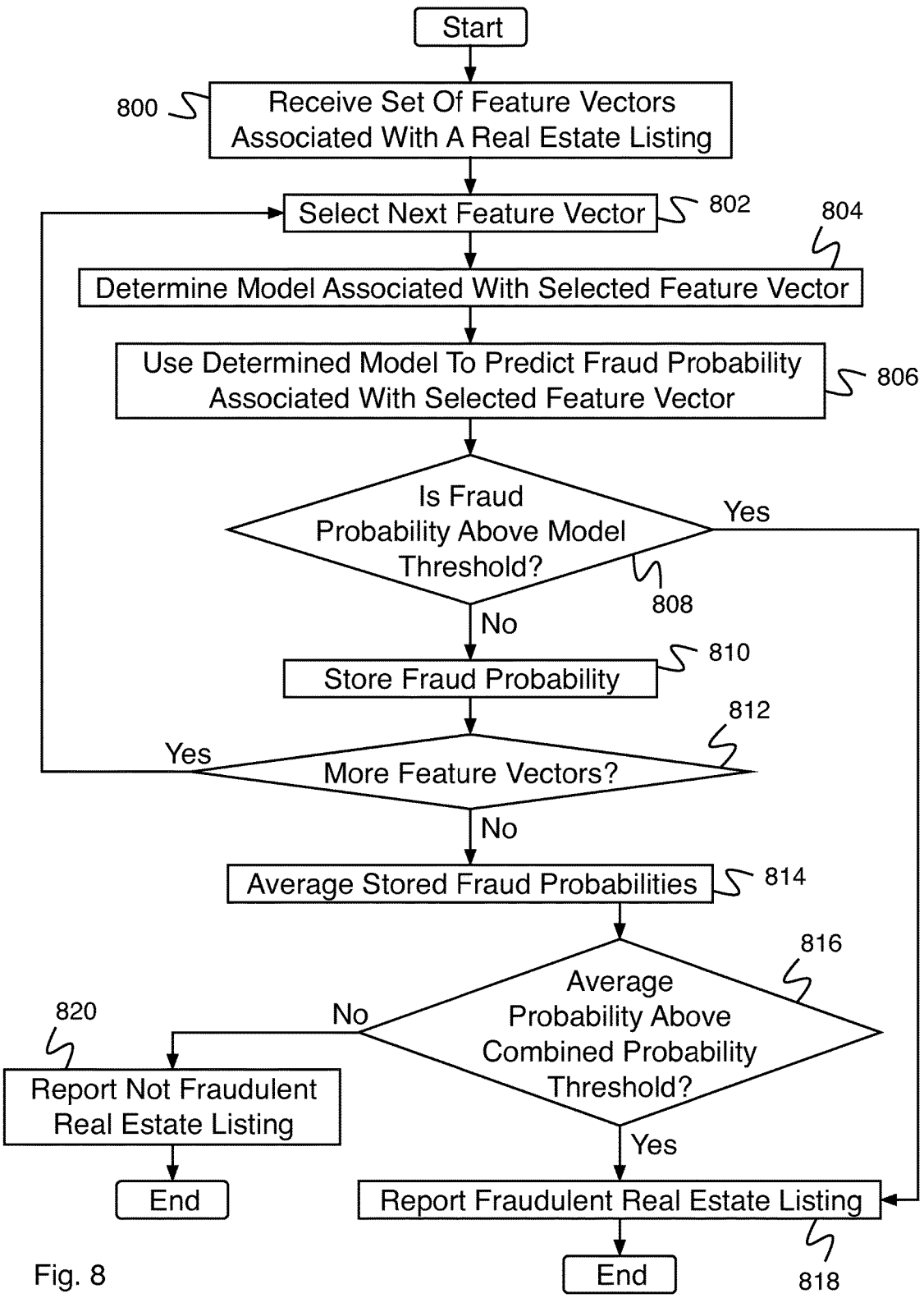
FIG. 8 is a flow diagram illustrating an embodiment of a process for predicting whether one or more feature vectors corresponds to fraudulent data using one or more models.

FIG. 8 is a flow diagram illustrating an embodiment of a process for predicting whether one or more feature vectors corresponds to fraudulent data using one or more models. In some embodiments, the process of FIG. 8 implements 510 of FIG. 5. In the example shown, in 800, a set of feature vectors associated with a real estate listing is received. In some embodiments, each feature vector of the set of feature vectors is created by a different feature vector extractor of a set of feature vector extractors from a single real estate listing. In 802, the next feature vector is selected. In some embodiments, the next feature vector comprises the first feature vector. In 804, the model associated with the selected feature vector is determined. In 806, the determined model is used to predict the fraud probability associated with the selected feature vector. In some embodiments, determining a fraud probability using a model and a feature vector comprises determining a vector distance between the feature vector and a model classifier. In 808, it is determined whether the fraud probability is above a model threshold (e.g., a probability threshold associated with the determined model). In some embodiments, the model threshold is set to be very high (e.g., the fraud probability above the model threshold corresponds to the model indicating very strongly that the feature vector is associated with fraud). In the event it is determined that the fraud probability is above the model threshold, control passes to 818. In the event it is determined that the fraud probability is not above the model threshold, control passes to 810. In 810, the fraud probability is stored. In 812, it is determined whether there are more feature vectors. In the event it is determined that there are more feature vectors, control passes to 802. In the event it is determined that there are not more feature vectors, control passes to 814. In 814, the stored fraud probabilities (e.g., the fraud probabilities stored in steps 810) are averaged. In some embodiments, the stored fraud probabilities are averaged using an unweighted average (e.g., the stored fraud probabilities are summed and divided by the total number of stored fraud probabilities). In some embodiments, the store fraud probabilities are averaged or combined using a weighted average (e.g., the stored fraud probabilities are each multiplied by a weighting factor, then summed and divided by the total number of stored fraud probabilities). In some embodiments, weighting factors for a weighted average comprise 0.25 for a first stored fraud probability and 0.75 for a second stored fraud probability. In 816, it is determined whether the average probability is above the combined probability threshold (e.g., a threshold for the averaged probability values). In the event it is determined that the average probability is above the average probability threshold, control passes to 818. In 818, a fraudulent real estate listing is reported. In the event it is determined in 816 that the average probability is not above the combined probability threshold, control passes to 820. In 820, it is reported that the real estate listing is not fraudulent.

Figure 9:
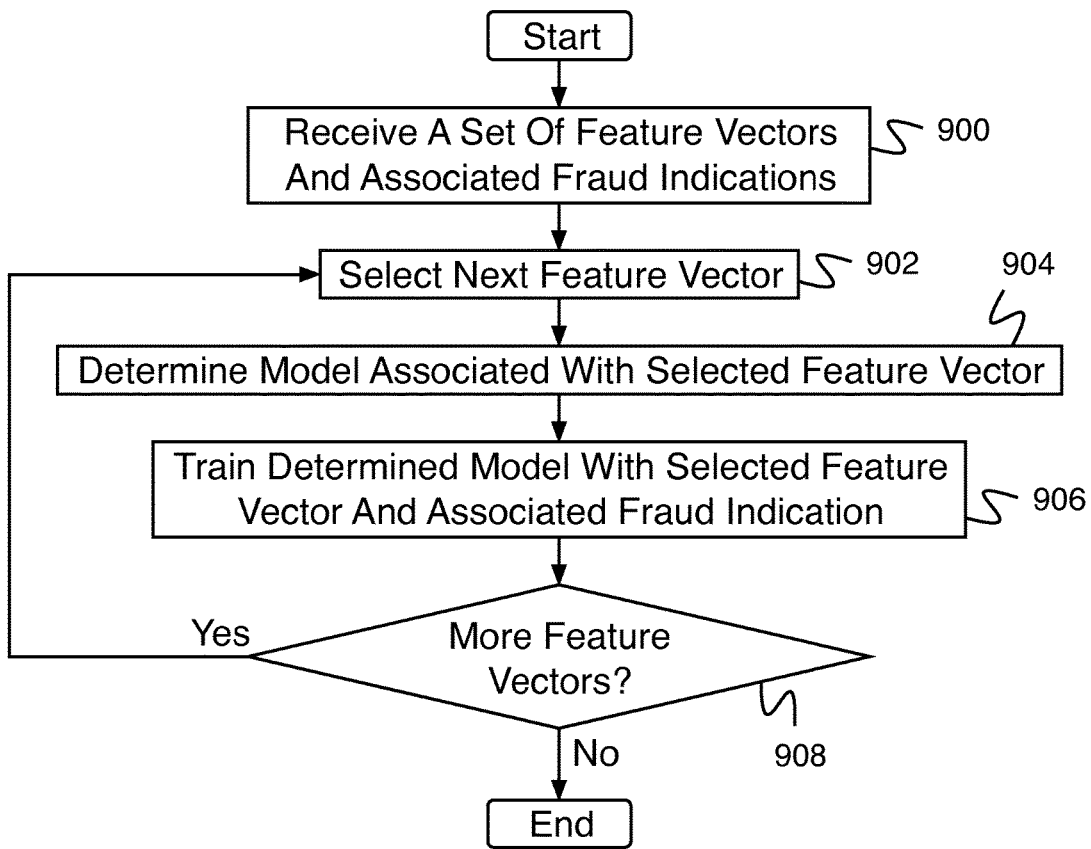
FIG. 9 is a flow diagram illustrating an embodiment of a process for training one or more models.

FIG. 9 is a flow diagram illustrating an embodiment of a process for training one or more models. In some embodiments, the process of FIG. 9 implements 704 of FIG. 7. In the example shown, in 900, a set of feature vectors and associated rental fraud indications is received. In 902, the next feature vector is selected. In some embodiments, the next feature vector comprises the first feature vector. In 904, the model associated with selected feature vector is determined. In some embodiments, each model (e.g., of the set of models stored by predictor 308 of FIG. 3) corresponds to a given feature vector extractor, and feature vectors extracted by that feature vector are associated with that model. In 906, the determined model is trained with the selected feature vector and the associated rental fraud indication. In some embodiments, training the model comprises adding the feature vector to the set of feature vectors associated with the model and adjusting the model classifier to optimally classify its set of feature vectors (e.g., including the newly added feature vector). In 908, it is determined whether there are more feature vectors. In the event there are more feature vectors, control passes to 902. In the event there are not more feature vectors, the process ends.

Figure 10:
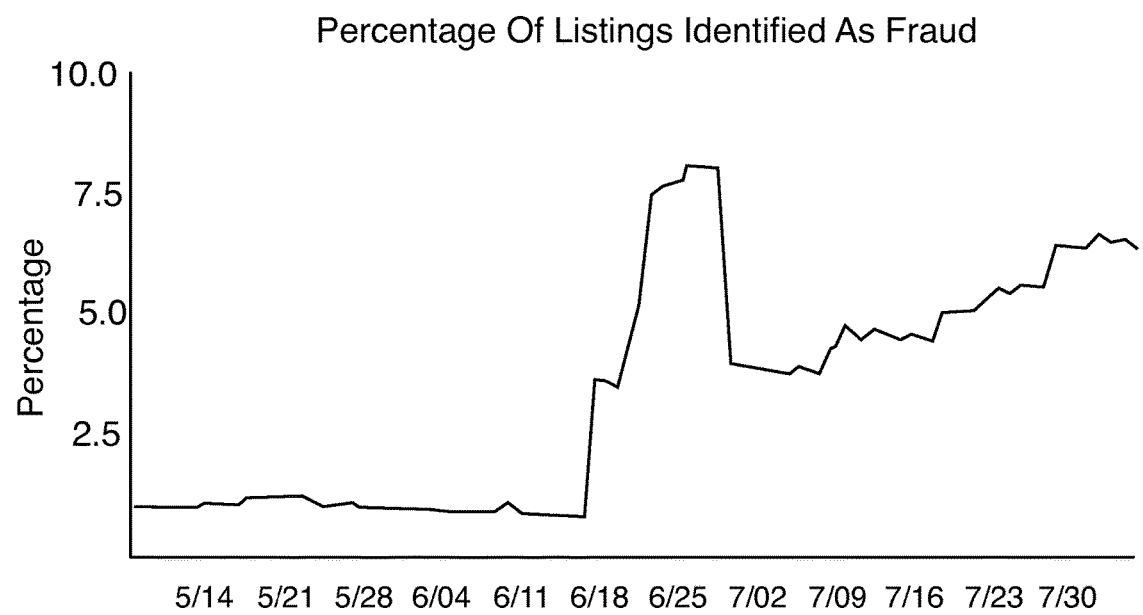
FIG. 10 is a diagram illustrating an embodiment of a graph of a percentage of listings identified as fraud.

FIG. 10 is a diagram illustrating an embodiment of a graph of a percentage of listings identified as fraud. In some embodiments, the graph of FIG. 10 shows the percentage of fraudulent real estate listings identified by a fraudulent real estate listing detector (e.g., fraudulent real estate listing detector 300 of FIG. 3). In the example shown, the fraudulent real estate listing detector identifies between 1 and 10 percent of real estate listings in a typical real estate listing system as fraud.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for rental fraud detection, comprising:
an input interface configured to:
receive a set of training data, wherein the set of training data comprises a set of rental fraud indications; and
receive a set of prediction data;
a feature vector extractor configured to:
extract a first training set of feature vectors from the set of training data, wherein the set of training data comprises real estate listings determined to be not fraudulent and real estate listings determined to be fraudulent; and
extract a first test feature vector from the set of prediction data, wherein the set of prediction data comprises one or more real estate listings of undetermined fraudulence;
a model builder configured to:
build a first model using the first training set of feature vectors and the rental fraud indications; and
a predictor configured to:
predict whether the first test feature vector corresponds to fraudulent data using the first model.

2. The system of claim 1, wherein the feature vector extractor is further configured to:
extract a second training set of feature vectors from the set of training data; and
extract a second test feature vector from the set of prediction data.

3. The system of claim 2, wherein the model builder is further configured to:
build a second model using the second training set of feature vectors and the rental fraud indications.

4. The system of claim 3, wherein the predictor is further configured to:
predict whether the first test feature vector and the second test feature vector correspond to fraudulent data using the first model and the second model.

5. The system of claim 3, wherein the predictor is further configured to:
predict whether the first test feature vector and the second test feature vector correspond to fraudulent data using a weighted combination of the first model and the second model.

6. The system of claim 5, wherein the weight associated with the first model comprises 0.25 and the weight associated with the second model comprises 0.75.

7. The system of claim 1, wherein a feature of the first test feature vector comprises a property attribute.

8. The system of claim 7, wherein the property attribute comprises a property type.

9. The system of claim 7, wherein the property attribute comprises a number of bedrooms.

10. The system of claim 1, wherein a feature of the first test feature vector comprises a property location attribute.

11. The system of claim 10, wherein the property location attribute comprises a zip code.

12. The system of claim 10, wherein the property location attribute comprises a three digit zip code prefix.

13. The system of claim 1, wherein a feature of the first test feature vector comprises a property price attribute.

14. The system of claim 13, wherein the property price attribute comprises a property price percentile.

15. The system of claim 1, wherein a feature of the first test feature vector comprises a property agent attribute.

16. The system of claim 1, wherein a feature of the first test feature vector comprises a fraud rate.

17. The system of claim 1, wherein a feature of the first test feature vector comprises a property lister attribute.

18. The system of claim 2, wherein the second test feature vector and the first test feature vector comprise distinct features.

19. A method, performed by a computing system having a memory and a processor, for rental fraud detection, comprising:

receiving, with the processor, a set of training data, wherein the set of training data comprises a set of rental fraud indications;

receiving, with the processor, a set of prediction data;

extracting, with the processor, a first training set of feature vectors from the set of training data, wherein the set of training data comprises real estate listings determined to be not fraudulent and real estate listings determined to be fraudulent;

extracting, with the processor, a first test feature vector from the set of prediction data, wherein the set of prediction data comprises one or more real estate listings each of undetermined fraudulence;

building, with the processor, a first model using the first training set of feature vectors and the rental fraud indications; and predicting, with the processor, whether the first test feature vector corresponds to fraudulent data using the first model.

20. A computer program product for rental fraud detection, the computer program product being embodied in a computer readable storage medium and comprising computer instructions for:

receiving a set of training data, wherein the set of training data comprises a set of rental fraud indications;

receiving a set of prediction data;

extracting a first training set of feature vectors from the set of training data, wherein the set of training data comprises real estate listings determined to be not fraudulent and real estate listings determined to be fraudulent;

extracting a first test feature vector from the set of prediction data, wherein the set of prediction data comprises one or more real estate listings each of undetermined fraudulence;

building a first model using the first training set of feature vectors and the rental fraud indications; and predicting whether the first test feature vector corresponds to fraudulent data using the first model.

* * * * *

UNITED STATES PATENT AND TRADEMARK OFFICE
CERTIFICATE OF CORRECTION

PATENT NO. : 9,990,639 B1
APPLICATION NO. : 14/558390
DATED : June 5, 2018
INVENTOR(S) : Kong et al.

Page 1 of 1

It is certified that error appears in the above-identified patent and that said Letters Patent is hereby corrected as shown below:

On the Title Page

On the page 2, in Column 2, under "Other Publications", Line 22, delete ""Gaffe:" and insert -- "Caffe: --, therefor.

In the Drawings

On sheet 7 of 10, in Figure 7, reference numeral 710, Line 1, delete "Acheive" and insert -- Achieve --, therefor.

Signed and Sealed this
Fourteenth Day of August, 2018

Andrei Iancu
*Director of the United States Patent and Trademark Office*